Aug. 9, 1960

W. A. SHIELDS
APPARATUS FOR CLEANING VIALS AND INSERTING A PLUNGER INTO ONE END OF EACH CLEANED VIAL

Filed Nov. 22, 1955

INVENTOR.
W. A. Shields
BY
John A. Seifert
ATTORNEY

Aug. 9, 1960 W. A. SHIELDS 2,948,004
APPARATUS FOR CLEANING VIALS AND INSERTING A PLUNGER
INTO ONE END OF EACH CLEANED VIAL
Filed Nov. 22, 1955 8 Sheets-Sheet 2

INVENTOR.
W. A. Shields
BY
John A. Seifert
ATTORNEY

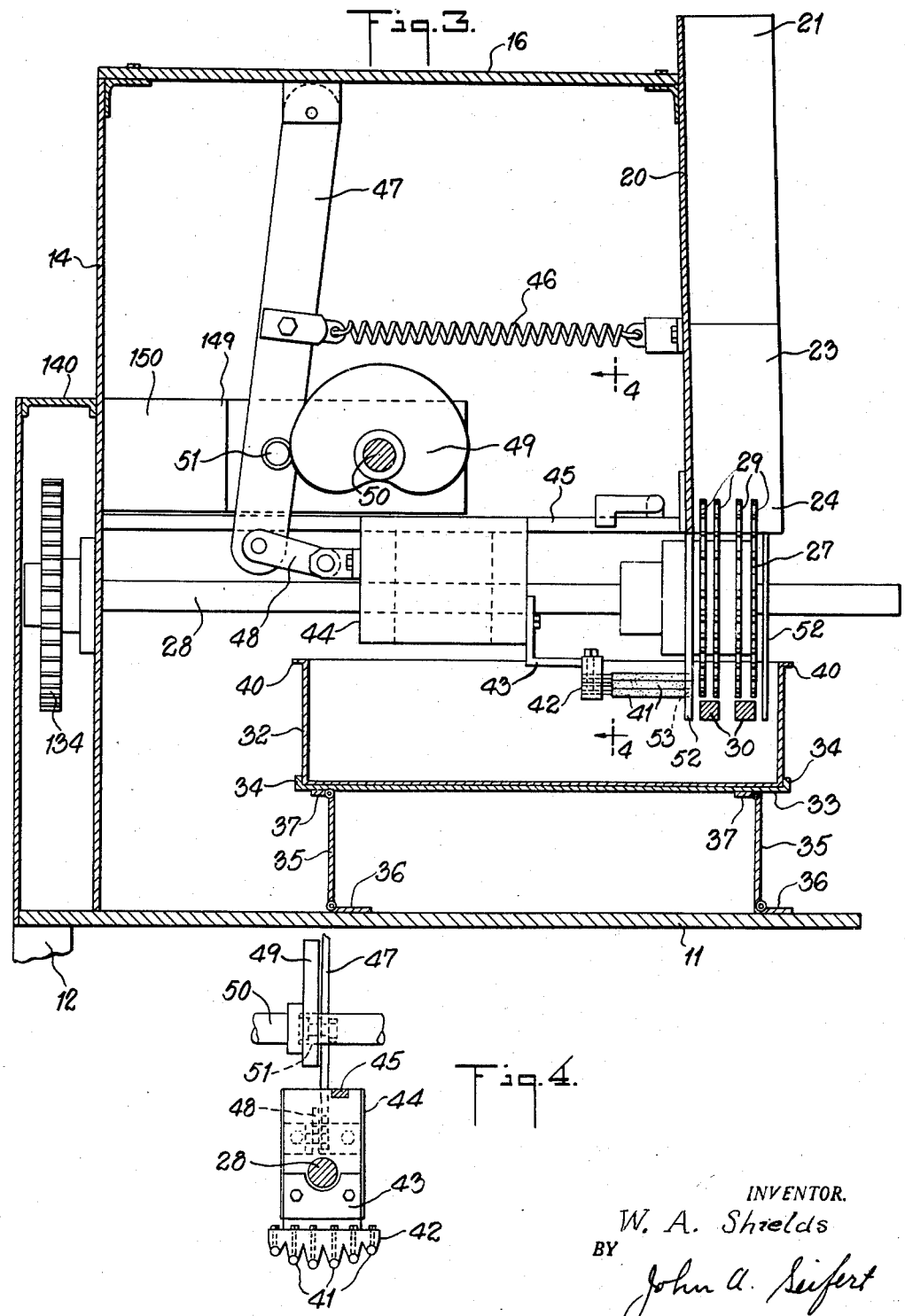

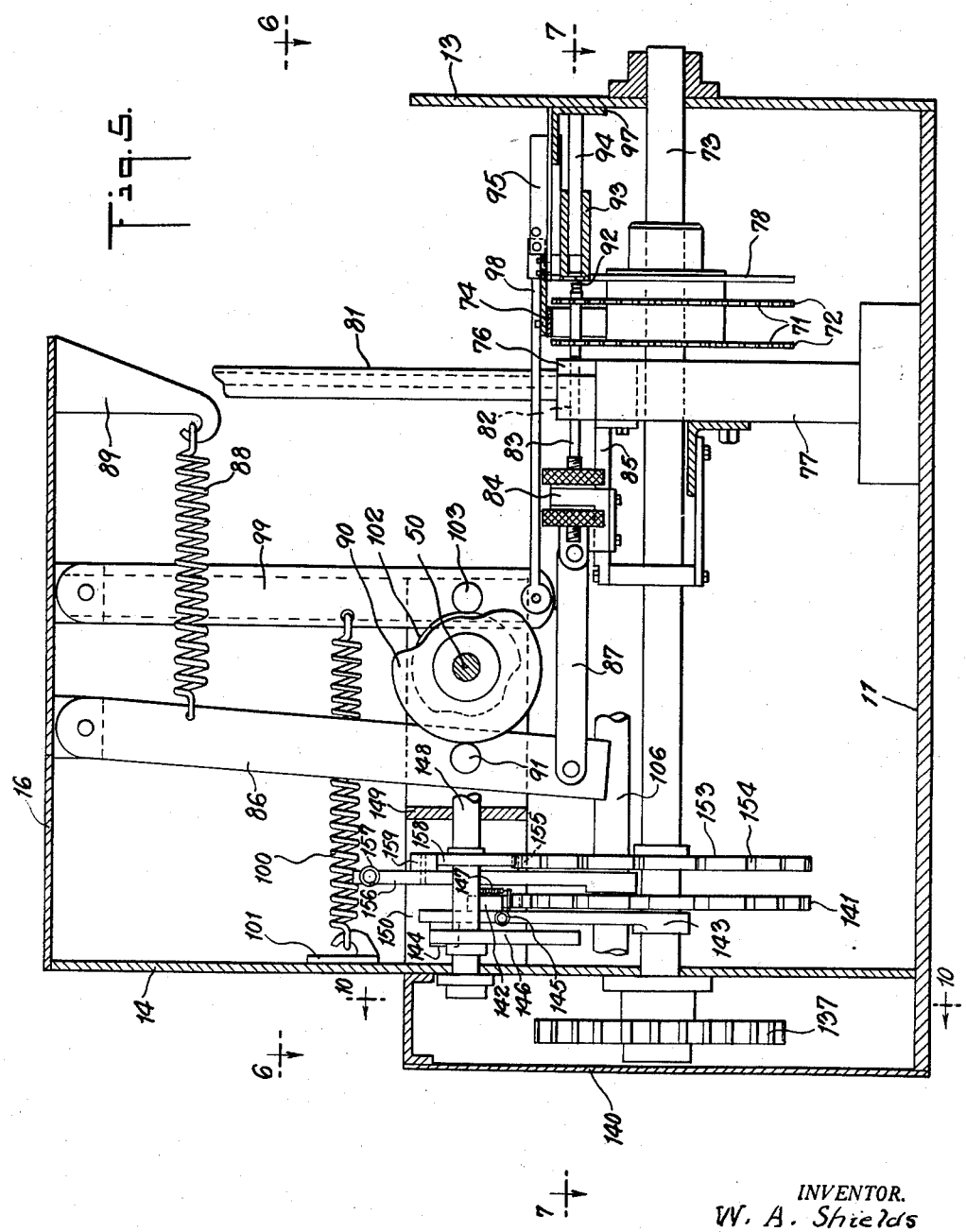

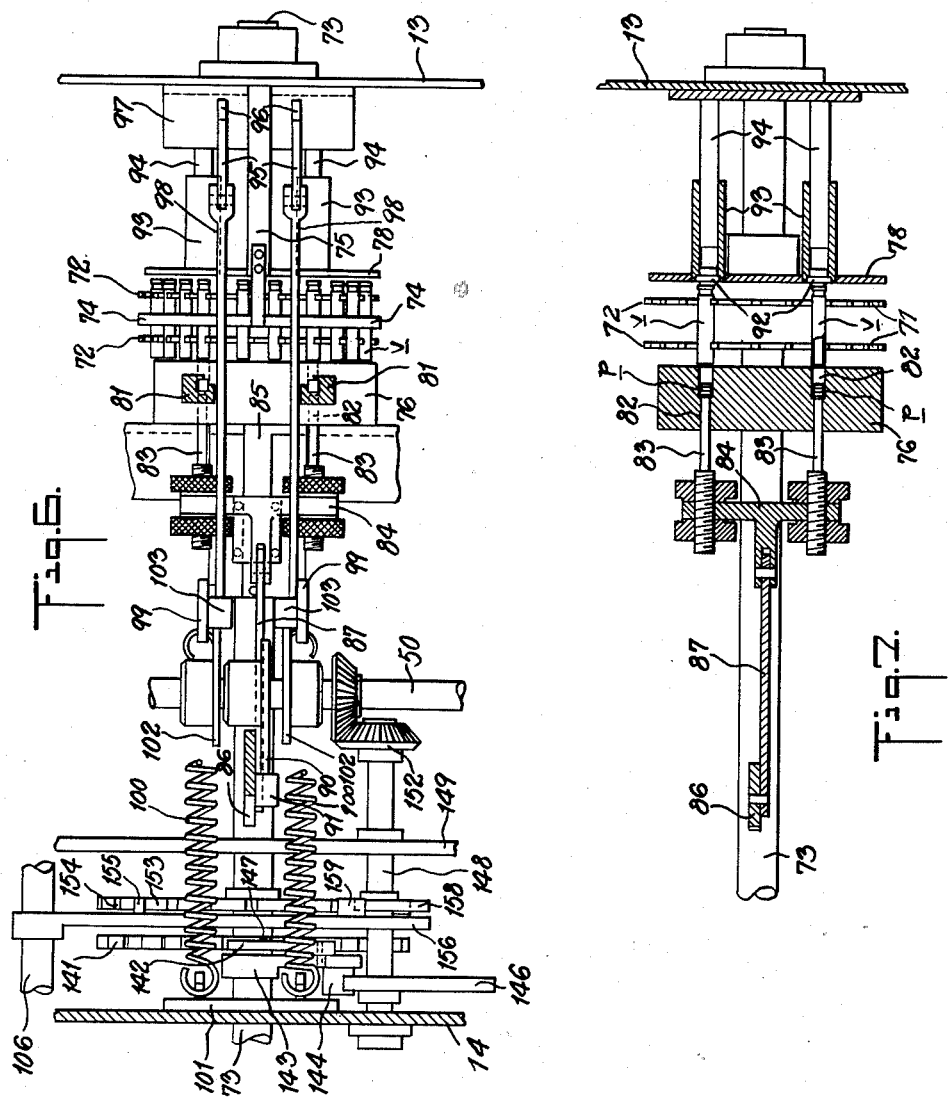

Aug. 9, 1960 W. A. SHIELDS 2,948,004
APPARATUS FOR CLEANING VIALS AND INSERTING A PLUNGER
INTO ONE END OF EACH CLEANED VIAL
Filed Nov. 22, 1955 8 Sheets-Sheet 6

INVENTOR.
W. A. Shields
BY John A. Seifert
ATTORNEY

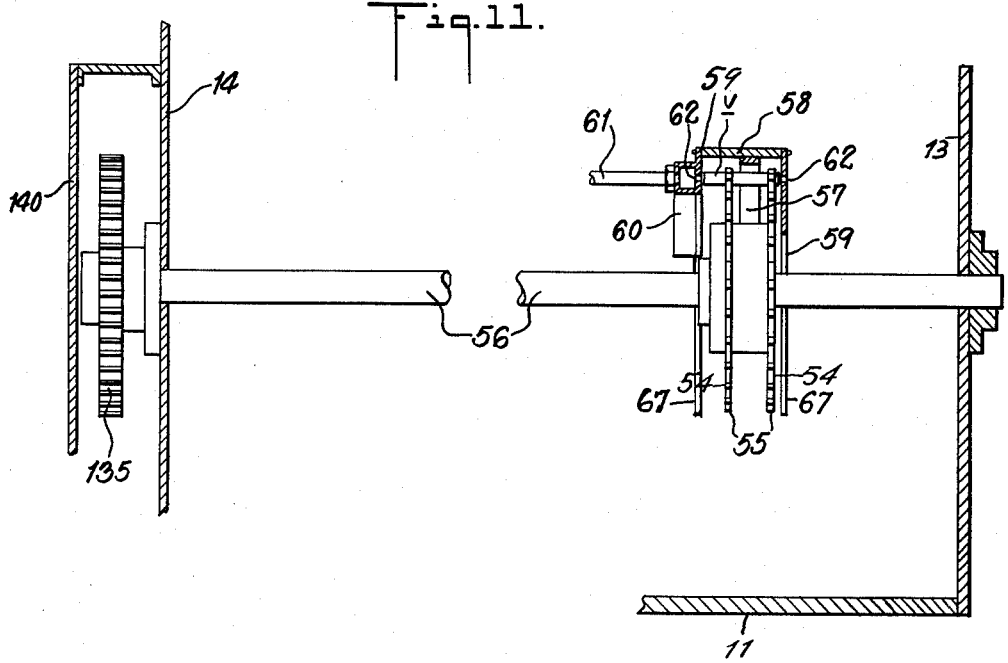
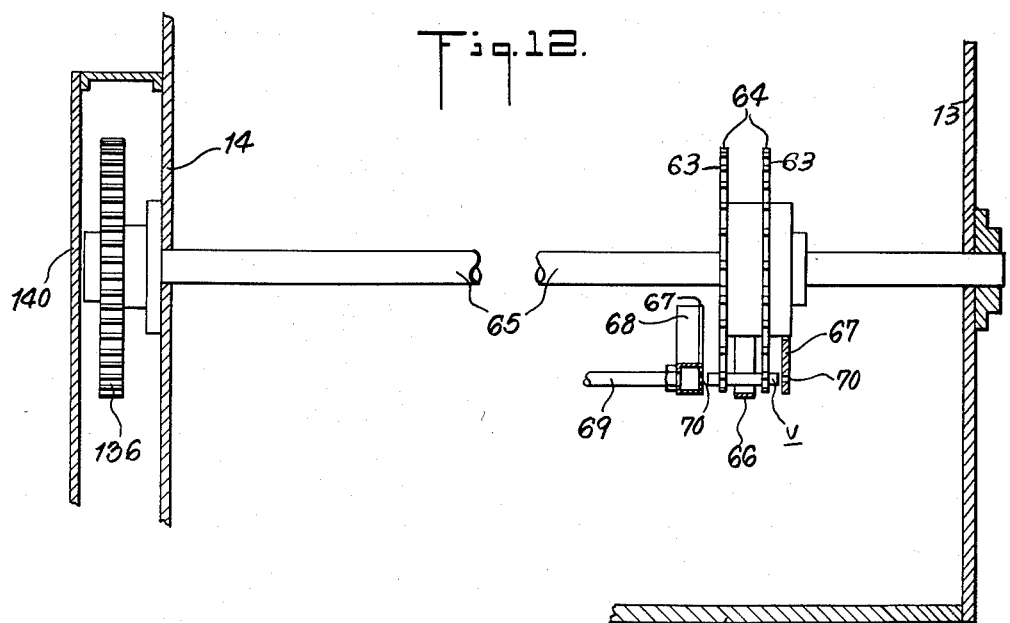

United States Patent Office 2,948,004
Patented Aug. 9, 1960

2,948,004

APPARATUS FOR CLEANING VIALS AND INSERTING A PLUNGER INTO ONE END OF EACH CLEANED VIAL

Walter A. Shields, 181—41 Henley Road, Jamaica, N.Y.

Filed Nov. 22, 1955, Ser. No. 548,368

7 Claims. (Cl. 15—4)

This invention relates to apparatus for cleaning vials and inserting a plunger into one end of each cleaned vial prior to filling said vial with a medicament through the opposite end and sealing said opposite end. The opposite end of the vial is sealed by a closure cap adapted to be punctured and connected to a hypodermic needle and the medicament is discharged from the vial through the hypodermic needle by pushing the plunger into the vial.

Prior to this invention, it was customary to clean the vials and insert a plunger into one end of each cleaned vial by separate operations which were slow and costly.

It is an object of this invention to automatically perform all operations necessary to place the vials in proper condition to be immediately filled with the medicament and sealed.

It is another object of the invention to periodically and automatically present a traveling train of vials to a sequence of operations whereby the vials are washed in a cleansing bath, rinsed, dried, one end of each dried vial is closed by a plunger, and the vials closed at one end are again washed, rinsed and dried before removal of said vials to means for filling and sealing the vials.

It is another object of the invention to actuate vial transporting means and all of the operative devices from the same drive shaft.

It is another object of the invention to intermittently actuate the vial transporting means and actuate the operative devices in timed sequence to the intermittent actuation of the vial transporting means.

It is another object of the invention to transport the vials in an undulating path having rises and dips and providing the operative devices alternately at the rises and dips in the undulating path of travel of the vials.

Another object of the invention is to pivotally support a tank of cleansing liquid whereby the tank is lowered out of the path of travel of the vials when it is desired to change the cleansing liquid.

A further object of the invention is to simultaneously insert plungers into corresponding ends of vials at spaced points in the undulating path of travel of the vials while holding said spaced vials against longitudinal movement.

Other objects and advantages of the invention will be described hereinafter.

In the drawings accompanying and forming a part of this application:

Figure 3 is a cross-sectional view, on an enlarged scale, taken on the line 3—3 of Figure 1 looking in the direction of the arrows to show part of the vial transporting means in relation to a vial hopper, a tank of cleansing liquid and brushes for scrubbing the vials on said part of the vial transporting means;

Figure 4 is a front elevational view of the brushes and part of their actuating mechanism looking from the line 4—4 of Figure 3 in the direction of the arrows;

Figure 1:
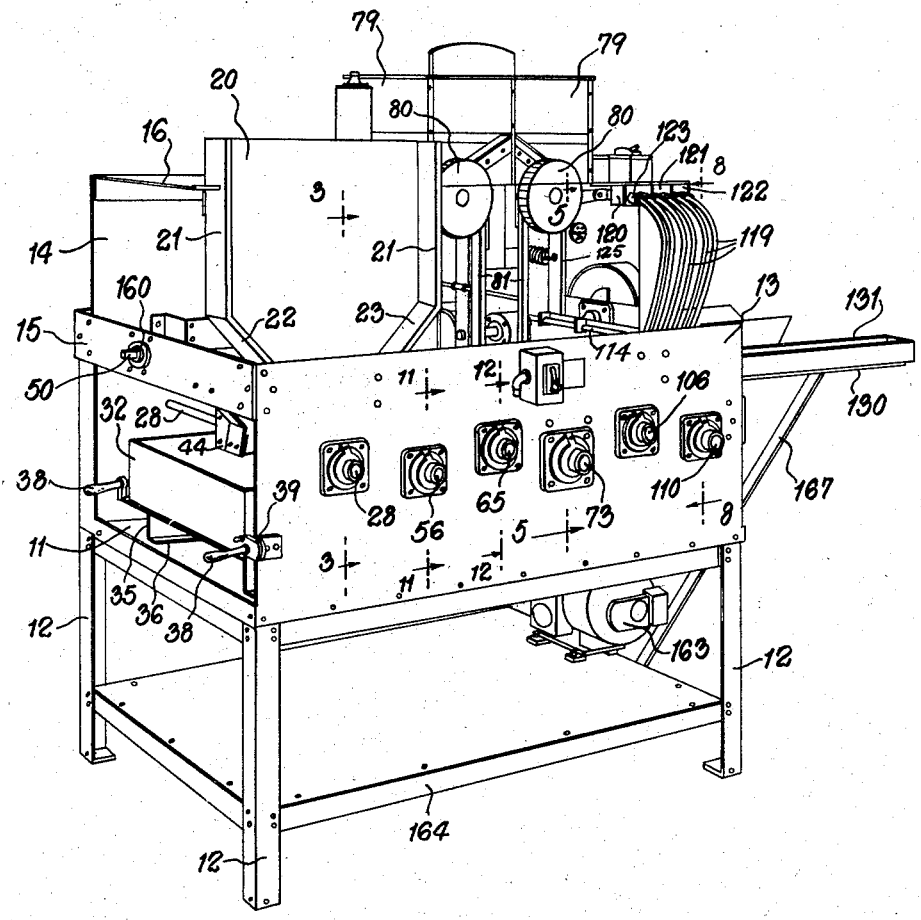
Figure 1 is a perspective view of the apparatus forming the embodiment of the invention.
Figure 8:
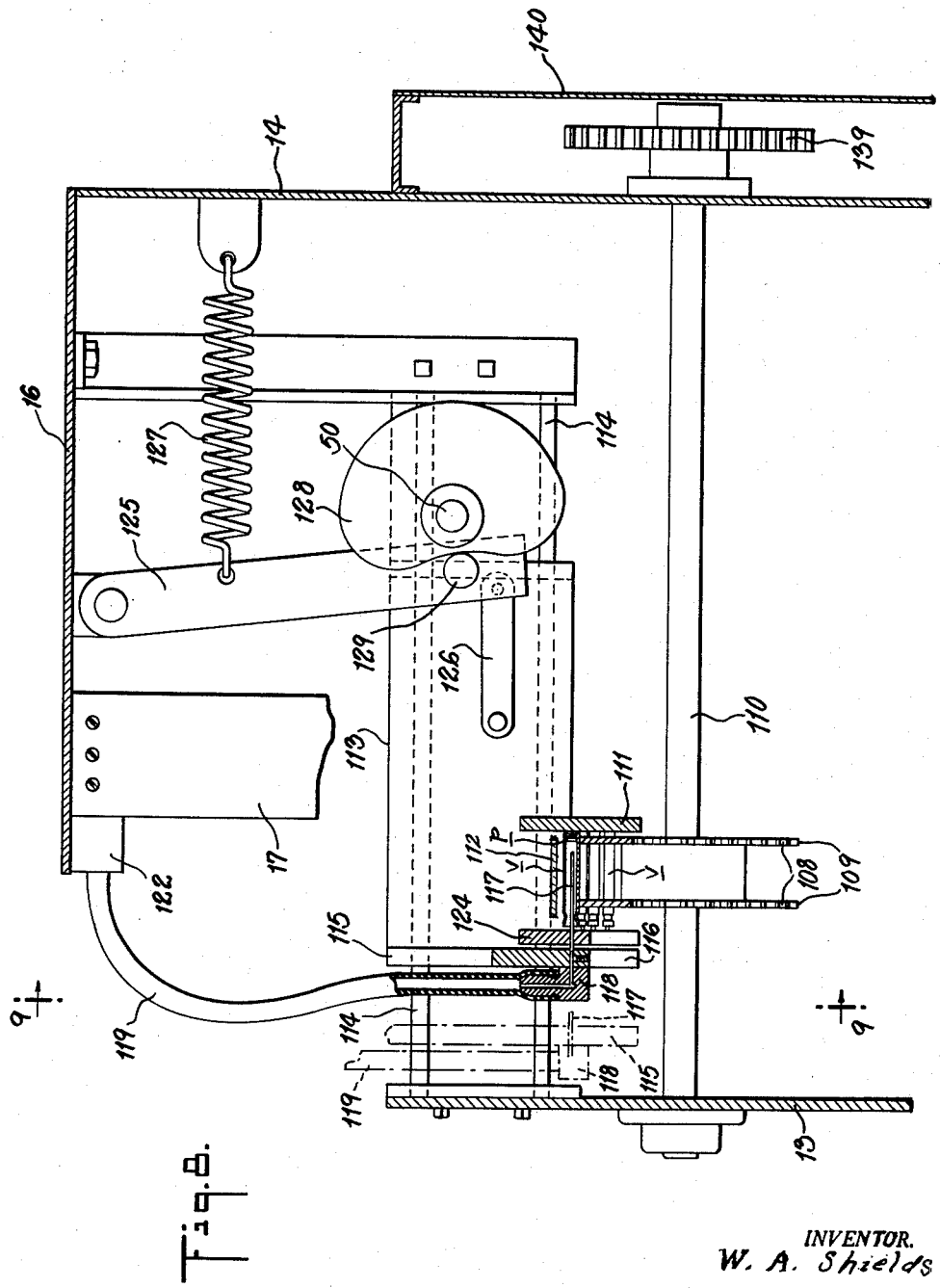
Figure 9:
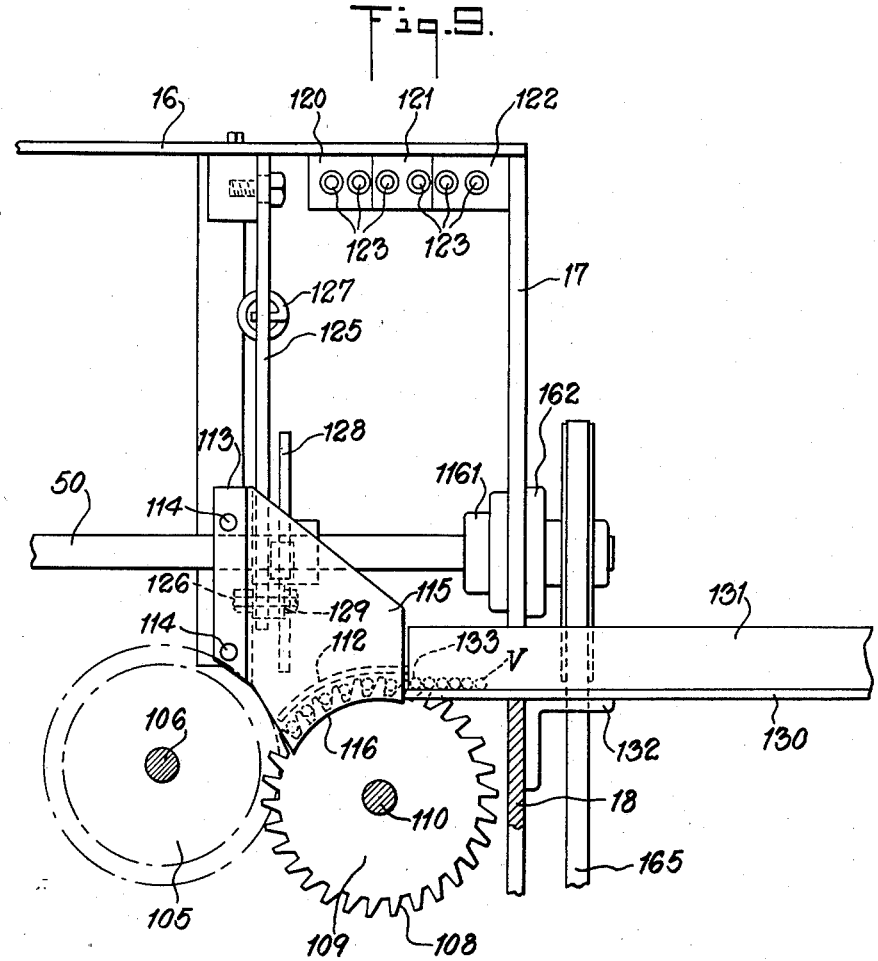
Figure 10:
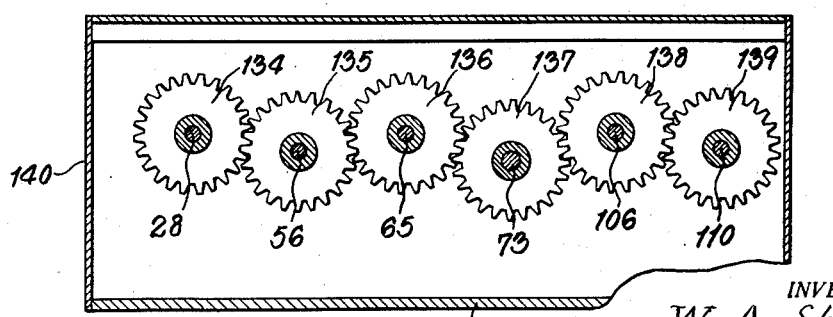

Figure 5 is a cross-sectional view, on an enlarged scale, taken on the line 5—5 of Figure 1 looking in the direction of the arrows to show means for inserting plungers into corresponding ends of vials at spaced points in the undulating path of travel of the vials, means for holding said spaced vials against longitudinal movement and means for imparting intermittent movement to the vial transporting means;

Figure 6 is a plan view looking from the line 6—6 of Figure 5 in the direction of the arrows to show the connections between actuating means for the means to hold the spaced vials against longitudinal movement while plungers are inserted into said vials and said holding means;

Figure 7 is a sectional plan view taken on the line 7—7 of Figure 5 looking in the direction of the arrows to show the connection between actuating means for the plunger inserting means and said plunger inserting means;

Figure 8 is a cross-sectional view, on an enlarged scale, taken on the line 8—8 of Figure 1 looking in the direction of the arrows to show means for injecting in sequence different types of fluids into the end of each vial opposite the end closed by a plunger;

Figure 9 is a fragmentary front view of the means for injecting in sequence different types of fluids looking from the line 9—9 of Figure 8 in the direction of the arrows;

Figure 10 is an elevational view looking from the line 10—10 of Figure 5 of a train of gears for imparting rotation in opposite directions to adjacent peripherally recessed disk mounted in a train to form the dial transporting means;

Figure 11 is a partial cross-sectional view of the apparatus, on an enlarged scale, taken on the line 11—11 of Figure 1 looking in the direction of the arrows to show part of the vial transporting means in relation to means for discharging a rinse into the vials supported by said part of the vial transporting means subsequently to the scrubbing actions of the brushes shown in Figure 3; and Figure 12 is a partial cross-sectional view of the apparatus, on an enlarged scale, taken on the line 12—12 of Figure 1 looking in the direction of the arrows to show part of the vial transporting means in relation to means for discharging jets of drying fluid into the vials supported by said part of the vial transporting means subsequently to the rinsing action of the means shown in Figure 11.

In carrying out the invention illustrated in the accompanying drawings, there is provided a supporting structure comprising a table top 11 supported by legs 12 and a superstructure including a front wall 13 and a rear wall 14 of greater height than the front wall. Both the front and rear walls are extended upwardly from the table top and are braced by a beam 15 at one end of said walls. The superstructure also includes a top wall 16 supported at the rear by the top edge of the rear wall 14 and at one end by an upright 17 supported by the table top 11 and braced from the front wall 13 by a beam 18, as shown in Figures 2 and 9.

Figure 2:
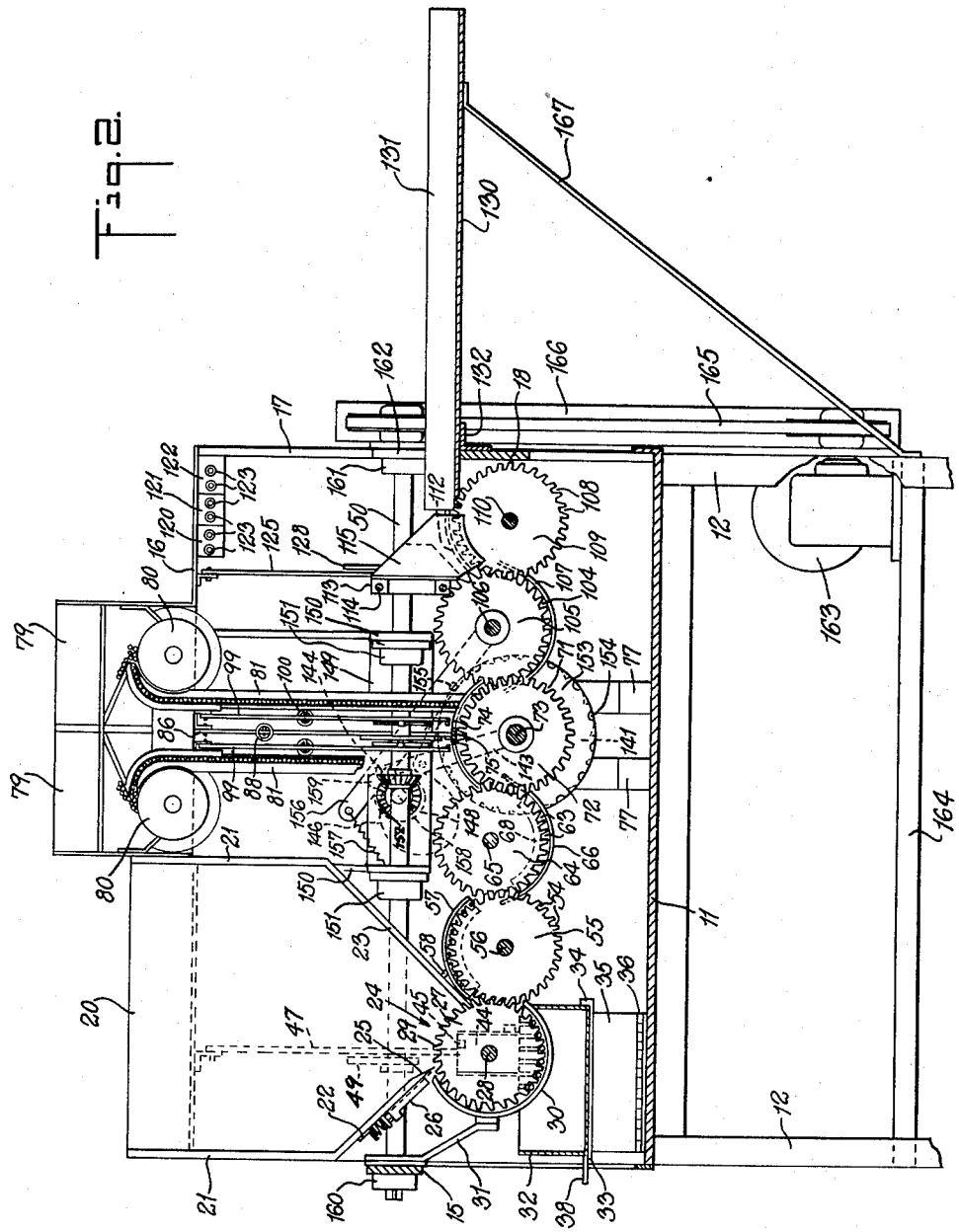
Figure 2 is a front elevational view of the apparatus with a front wall removed and parts of the apparatus in section.

Vials v are supplied to the apparatus from a hopper comprising a vertical rear wall 20, vertical side walls 21 and converging bottom walls 22 and 23 having the bottom edges spaced from each other to form a discharge opening 24 of the hopper with the bottom wall 23 of greater length and terminating in a horizontal plane below the plane of termination of the bottom wall 22, as shown in Figure 2. The inner face of the bottom edge of the bottom wall 22 is beveled, as at 25 in Figure 2, and the exterior of said bottom wall 22 is provided with a feed device shown in a general way at 26 in Figure 2 to regulate the feed of vials in cooperation with the beveled face 25 to vial transporting means to be described hereinafter. The widths of the side walls 21 and the bottom walls 22, 23 are the same and are slightly greater than the lengths of the vials. The vials are stacked by hand in the hopper to extend lengthwise of the widths of the side walls 21 and the bottom walls 22, 23. The front of the hopper is shown to be open and is preferably closed by a transparent panel, not shown.

The vials are automatically transported from the hopper discharge opening 24 in an undulating path having rises and dips. This is accomplished by a train of laterally spaced disks having equidistantly spaced recesses in the peripheral portions of said disks and the recessed peripheral portions of adjacent laterally spaced disks traveling in overlapping vertical planes. The first of said laterally spaced disks are represented by four disks 27 secured in pairs on a shaft 28 rotatably mounted at the opposite end portions in the front wall 13 and the rear wall 14, as shown in Figures 1 and 3. The peripheral portions of the disks 27 are arranged with equidistantly spaced recesses 29 with the recesses of each disk in horizontal alignment and the recessed peripheral portions of the disks extended into the hopper discharge opening 24, as shown in Figures 2 and 3. The disks 27 are rotated in a counter-clockwise direction and the vials picked-up in the hopper and removed therefrom by the rotation of the disks 27 are retained in the recesses 29 by arcuate guide-rails 30 supported from the beam 15 by a bracket 31, as shown in Figure 2. The forward wall of each recess 29 extends at an obtuse angle to the bottom wall of each recess 29 and the rear wall of each recess 29 extended radially of the disk. This arrangement of the forward and rear walls of each recess 29 will facilitate the pick-up of the vials in the hopper by the recesses. Four disks 27 are provided to further facilitate the pick-up of the vials by the recesses 29 and prevent canting of the vials on the disks 27.

While the vials are retained in the recesses 29 by the rails 30, said vials are immersed in a bath of cleansing liquid, such as a water solution of soda-ash and soap, contained in a tank 32 supported in a horizontal plane to have the vials retained in the recesses 29 by the rails 30 travel through the liquid in the tank 32. The tank 32 is adjustably supported on the table top 11 by a platform 33 having vertical flanges 34 along the side and rear edges to retain the tank on the platform. The platform 33 is adjustably mounted on the table top 11 by a pair of double hinge members 35, each hinge member having one pivoted portion secured to the table top 11, as at 36 in Figure 3, and having the other pivoted portion secured to the bottom of the platform 33, as at 37 in Figure 3, so that the platform 33 and the tank 32 are adjusted to juxtaposed position on the table top 11 when it is desired to remove the tank from the apparatus for the purpose of changing the cleansing liquid. When the tank has been replenished with fresh cleansing liquid, the tank is placed on the platform 33 and the platform is raised to extend in parallel spaced relation to the table top 11, as shown in Figures 1, 2 and 3. To facilitate adjustment of the platform 33, handles 38 are provided at each end of the platform, as shown in Figures 1 and 2. To retain the platform 33 in raised position, a hook shaped latch 39 is pivoted on the front wall 13 and adapted to engage the adjacent handle 38, as shown in Figure 1. To facilitate removal of the tank 32 from the platform 33, the upper edges of the side walls of the tank are provided with flanges 40, as shown in Figure 3.

While the vials are immersed in the cleansing liquid in the tank 32, the interior of each vial is scrubbed by a brush of an arcuate row of brushes 41 removably mounted in a head 42 supported by a bracket 43 secured to a block 44 slidably mounted on the shaft 28 and guided by a bar 45 secured at the ends to the rear wall 14 and the hopper rear wall 20, as shown in Figures 3 and 4. The bar 45 also supports the hopper. The lock 44 is yieldingly urged toward the disks 27 by a spring 46 anchored at one end to the hopper rear wall 20 and having the opposite end connected to an intermediate portion of a lever 47 pivoted at one end to the top wall 16 and having the opposite end pivotally connected to the block 44 by a link 48. The actuation of the block 44 by the spring 46 is controlled by a cam disk 49 secured on a drive shaft 50 to engage a roller 51 mounted on a portion of the lever 47 between the spring 46 and the link 48. The engagement of the roller 51 with the low portion of the cam disk 49 will permit the spring 46 to move the brushes 41 into the vials. The engagement of the roller 51 with the high portion of the cam disk 49 will move the brushes 41 out of the vials against the force of the spring 46. To retain the vials in the recesses 29 against longitudinal movement during reciprocation of the brushes into and out of the vials, plates 52 are suspended from the hopper to extend in parallel spaced relation to the outside disks 27, as shown in Figure 3. The inner plate 52 is arranged with an arcuate row of spaced openings 53 in alignment with the brushes 41 to permit travel of the brushes through said plate 52 and into the vials aligned with said openings. In the present illustration of the invention, there are shown six brushes 41 and six openings 53, so that all of the vials fully submerged in the cleansing liquid in the tank 32 are scrubbed three times during said submersion due to the intermittent rotation of the disks 27 for a distance of two recesses 29 as fully described hereinafter. The brushes 41 are moved into and out of the vials during the rest periods of the disks 27. This is accomplished by having the high portion of the cam disk 49 of greater extent than the low portion of said cam disk whereby the brushes are positioned out of the path of travel of the vials for a longer period than the period of movement of the brushes into and out of the vials to permit the intermittent travel of the vials.

After the vials leave the bath of cleansing liquid in the tank 32, they are transferred to equidistantly spaced recesses 54 in the peripheral portions of two laterally spaced disks 55 secured on a shaft 56 rotatably supported at the opposite end portions in the front wall 13 and the rear wall 14 in a horizontal plane below the horizontal plane of the shaft 28, as shown in Figures 1, 2 and 10. The peripheral portions of the disks 55 overlap the peripheral portions of the two middle disks 27 whereby the vials in the disk recesses 29 are transferred to the disk recesses 54 by the rotation of the disks 27 in a counter-clockwise direction and the rotation of the disks 55 in a clockwise direction. The vials are transported by the disks 55 above the shaft 56. The vials are retained in the recesses 54 against outward movement radially of the disks 55 while being transported by the disks 55 by an arcuate rail 57 supported by a bracket 58 secured to the hopper wall 23 in a vertical plane extending between the disks 55 and in an arc encircling the path of travel of the vials on the disks 55. The vials in the recesses 54 are retained against longitudinal movement while being transported by the disks 55 by arcuate plates 59 extending on the outsides of the disks 55 in lateral alignment with the path of travel of the vials on the disks 55 and supported by the bracket 58, as shown in Figure 11. The guide plate 59 furthest from the front wall 13 is arranged with a jacket 60 corresponding in shape to said plate 59 and connected by a conduit 61 to a source of supply of a rinse, such as hot water from a hot water heater, not shown. The jacket 60 and its supporting guide plate 59 are arranged with orifices 62 in lateral alignment with the rest positions of the vials on the disks 55 whereby jets of the rinse are discharged into the vials. The side walls of the recesses 54 are in reversed order to the arrangement of the side walls of the recesses 29 whereas the forward wall of each recess 54 extends at an obtuse angle and the rear wall extends radially of the disks 55.

After the vials are thoroughly rinsed, they are transferred to equidistantly spaced recesses 63 in the peripheral portions of two laterally spaced disks 64 secured on a shaft 65 rotatably supported by the front wall 13 and the rear wall 14 to extend in substantially the same horizontal plane as the shaft 28, as shown in Figures 1, 2 and 10. The recessed peripheral portions of the disks 64 overlap the recessed peripheral portions of the disks 55 whereby the vials in the recesses 54 after leaving the last orifice 62 are transferred to the recesses 63 by the clockwise rotation of the disks 55 and the counter-clockwise rotation of the disks 64. The vials are transported by the disks 64 below the shaft 65. The side walls of the recesses 63 are arranged in the same manner as the side walls of the recesses 29 in that the forward walls are at an obtuse angle to the bottom walls and the rear walls are radially of the disks 64. The vials are retained in the recesses 63 against outward movement radially of the disks 64 by an arcuate rail 66 supported in a vertical plane between the disks 64 and in an arc encircling the path of travel of the vials on said disks. The vials are also retained in the recesses 63 against longitudinal movement by arcuate guide plates 67 formed by continuing the guide plates 59 to extend along the outsides of the path of travel of the vials on the disks 64. The guide plate 67 furthest from the front wall 13 is provided with a jacket 68 connected by a conduit 69 to a source of supply of drying fluid under pressure, such as an air compressor, not shown. The jacket 68 and associated plate 67 are provided with equidistantly spaced and aligned orifices 70 in lateral alignment with the rest positions of the vials on the disks 64 to discharge jets of drying fluid into said vials, as shown in Figure 12.

The dried vials are transferred from the recesses 63 to equidistantly spaced recesses 71 in the peripheral portions of a pair of laterally spaced disks 72 secured on a shaft 73 rotatably supported at the opposite end portions by the front wall 13 and the rear wall 14 in a horizontal plane below the horizontal planes of the shafts 28, 56 and 65, as shown in Figures 1, 2 and 10. The recessed peripheral portions of the disks 72 overlap the recessed peripheral portions of the disks 64. The disks 72 are rotated in a clockwise direction and the walls of the recesses 71 are arranged in the same manner as the recesses 54 in the clockwise rotating disks 55. The vials are transported by the disks 72 in an arcuate path above the shaft 73. The vials are retained in the recesses 71 against outward movement radially of the disks 72 by a pair of resilient fingers 74 mounted on a bracket 75 secured to the front wall 13, as shown in Figure 6. The vials are retained in the recesses 71 against longitudinal movement by a block 76 supported at the outside of the disk 72 furthest from the front wall 13 by two pedestals 77 supported by the table top 11, as shown in Figures 2, 5, 6 and 7, and by a plate 78 at the outside of the disk 72 nearest the front wall 13. The end of each vial in the recesses 71 adjacent the block 76 is closed by a resilient plunger p supplied from a pair of hoppers 79 mounted on the top wall 16 of the superstructure and having discharge openings in the bottoms in which feed wheels 80 are rotatably mounted to successively discharge plungers extending lengthwise in horizontal planes into vertical chutes 81 having their lower ends supported by the block 76 and communicating with laterally spaced bores 82 extending in a horizontal plane through the block 76 to deliver successive plungers to said bores 82. The plungers in the bores 82 are inserted simultaneously into vials in predeterminedly spaced recesses 71 while the disks 72 are at rest. In the present illustration of the invention, said recesses are spaced four recesses apart, as shown in Figure 6, but the distance between said recesses may be varied depending on the amount of the intermittent movement of the disks 72. The plungers p in the bores 82 are inserted into said spaced vials by a pair of rods 83 having end portions slidable in the bores 82 and the opposite end portions adjustably mounted in a head 84 slidable on a bracket 85 mounted on the pedestals 77, as shown in Figure 5. The head 84 is reciprocated toward and away from the block 76 by a vertical lever 86 pivotally mounted at the upper end on the underside of the top wall 16 and the lower end of said lever 86 is pivotally connected to the head 84 by a link 87. The lower end of the lever 86 is yieldingly urged toward the block 76 by a spring 88 anchored at one end by a bracket 89 mounted on the underside of the top wall 16 and the opposite end of the spring is connected to an upper portion of the lever 86 below the pivotal mounting of said lever 86, whereby the rods 83 are yieldingly urged to insert the plungers p into the vials v. Retrograde movement is imparted to the rods 83 by a cam disk 90 secured on the drive shaft 50 to engage a roller 91 on the lever 86 between the spring 88 and the link 87. The cam disk 90 has a high portion of greater arcuate length than the low portion so that the period in which the rods 83 are positioned out of the vertical line of feed of the plungers p in the chutes 81 against the force of the spring 88 is longer than the period in which the rods 83 are moved by the spring 88 transversely of the vertical line of feed of the plungers p in the chutes 81, as shown in Figure 5. To yieldingly retain the vials v against longitudinal movement during the insertion of the plungers p into said vials, the ends of the vials opposite the ends into which the plungers are inserted are engaged by resilient abutments, each abutment being in the form of a plug 92 of resilient material mounted in one end portion of each of a pair of tubular members 93 having the opposite end portion slidable on a guide rod of a pair of guide rods 94 supported in a horizontal plane on the front wall 13. Each tubular member 93 is arranged with a vertical fin 95 slidable in a slot of a pair of slots 96 in a horizontal plate 97 secured to the inner face of the front wall 13, as shown in Figures 5 and 6. Each fin 95 is pivotally connected to one end of a link 98 having the opposite end pivotally connected to the lower end of a lever of a pair of vertical levers 99 pivotally mounted at the upper end on the underside of the top wall 16. The lower end of each lever 99 is yieldingly urged from the chutes 81 by a spring 100 anchored at one end to the rear wall 14 by a bracket 101 and the opposite end of the spring is connected to an intermediate portion of the lever 99 whereby the abutments 92 are yieldingly urged into engagement with the vials. The abutments 92 are moved away from the vials simultaneously with the movement of the rods 83 away from the vertical line of feed of the plungers p in the chutes 81 by a pair of cam disks 102 secured on the drive shaft 50 on opposite sides of the cam disk 90 and engaging rollers 103 on the levers 99. The rollers 103 are in front of the drive shaft 50 and the roller 91 is at the rear of the drive shaft so that the high portions of the cam disks 102 are on one side of the drive shaft 50 and the high portion of the cam disk 90 is on the opposite side of said drive shaft whereby the high portions of the cam disks 90 and 102 will simultaneously engage the rollers 91 and 103, respectively, and move the rods 83 from the vertical line of feed of the plungers p in the hopper chutes 81 and move the abutments 92 from the vials v, as shown in Figures 5, 6 and 7.

After the vials v are provided with the plungers p, they are transferred from the recesses 71 to equidistantly spaced recesses 104 in the peripheral portions of a pair of laterally spaced disks 105 secured on a shaft 106 rotatably mounted at the opposite end portions on the front wall 13 and the rear wall 14 to extend in substantially the same horizontal plane as the shafts 28 and 65, as shown in Figures 1, 2 and 10. The peripheral portions of the disks 105 overlap the peripheral portions of the disks 72. The disks 105 are rotated in a counter-clockwise direction and the forward wall of each recess 104 extends at an obtuse angle to the bottom wall and the rear wall of each recess 104 extends radially of the disks 105 in the same manner as the recesses 29 and 63. The vials are transported by the disks 105 in an arcuate path below the shaft 106. The vials are retained in the recesses 104 against radial movement outwardly of the disks 105 by an arcuate rail 107 extending in a vertical plane between the disks 105 and encircling the path of travel of the vials v in the recesses 104. No operation is performed on the vials while they are in the recesses 104. The vials are transferred from the recesses 71 to the recesses 104 by the clockwise rotation of the disks 72 and the counter-clockwise rotation of the disks 105.

The vials v are transferred from the recesses 104 to equidistantly spaced recesses 108 in the peripheral portions of a pair of laterally spaced disks 109 secured on a shaft 110 rotatably mounted at the opposite end portions on the front wall 13 and the rear wall 14 to extend substantially in the horizontal plane of the shaft 56, as shown in Figures 1, 2 and 10. The disks 109 are rotated in a clockwise direction and the recesses 108 are arranged in the same manner as the recesses 54 and 71. The peripheral portions of the disks 109 overlaps the peripheral portions of the disks 105. The vials are transferred from the recesses 104 to the recesses 108 by the counter-clockwise rotation of the disks 105 and the clockwise rotation of the disks 109. The vials are retained in the recesses 108 against longitudinal movement by an arcuate plate 111 adjacent to the outside of the disk 109 furthest from the front wall 13 to engage the ends of the vials v closed by the plungers p, as shown in Figure 8. The vials v are retained in the recesses 108 against radial movement outwardly of the disks 109 by an arcuate rail 112 extending in a vertical plane between the disks 109 and encircling the path of travel of the vials in the recesses 108. To facilitate insertion of the plungers p into the vials v, the plungers are coated with a lubricant, such as glycerin, and said lubricant will have a tendency to flow into the vials. As the vials are to contain a medicament, it is essential that they are free of foreign substances, and therefore it is necessary to remove said lubricant before filling the vials with the medicament. This operation is performed while the vials are in the recesses 108 and is accomplished in the following manner: A plate 113 is slidably mounted on a pair of rails 114 supported by the front wall 13 and the top wall 16, as shown in Figures 8 and 9. The slide plate 113 is provided with a lateral projection 115 at its front end extending in a vertical plane spaced from the outside of the disk 109 nearest the front wall 13 and arranged with an arcuate edge extending in the arc of said disk 109, as shown at 116 in Figures 2, 8 and 9. A series of needle-like nozzles 117 are mounted in the projection 115 in an arcuate row adjacent to and conforming with the arcuate edge 116. An end portion of each nozzle 117 is extended a short distance from the front face of the projection 115 for connecting a right-angle coupling 118 to said nozzle. Each coupling 118 is connected by a flexible hose 119 to a source of supply of three different types of fluids. These sources of supplies are connected to three separate junction-boxes 120, 121 and 122, each box having two outlet nipples 123. A hose 119 is connected to each nipple 123, as shown in Figures 1, 2, 8 and 9. The box 120 is connected to a source of supply of hot water, such as a hot water heater, not shown. The box 121 is connected to a source of supply of distilled water under pressure, such as a pump connected to the outlet of a distilled water reservoir, not shown. The box 122 is connected to a source of air under pressure, such as an air-compressor, not shown. The box 120 is connected by two of the hoses 119 to the first two couplings 118 in the extension 115 commencing from the left hand side of said extension as seen in Figure 9, whereby jets of hot water are injected into two vials by the nozzles 117 connected to said first two couplings and inserted into said vials to loosen the lubricant from the inner walls of said vials. The box 121 is connected by two of the hoses 119 to the second two couplings 118 in the extension 115 whereby jets of distilled water are injected into the next two vials by the nozzles 117 connected to said second two couplings and inserted into said vials to germicidally clean said vials. The box 122 is connected by two of the hoses 119 to the third two couplings 118 in the extension 115 whereby jets of air are injected into the next two vials by the nozzles 117 connected to said third two couplings and inserted into said vials to dry the vials. The lengths of the hoses 119 are sufficient to permit free sliding movement of the plate 113. Each of the nozzles 117 has an end portion extended from the rear face of the extension 115 and slidably supported by an arcuate guide plate 124 fixedly mounted to extend in a vertical plane adjacent to the open end of the vials in the recesses 108. The nozzles 117 are moved into and out of the vials when the disks 109 are at their period of rest by a lever 125 pivoted at the upper end portion on the top wall 16 and having the lower end portion pivotally connected to the plate 113 by a link 126. The lower end portion of the lever 125 is yieldingly urged toward the rear wall by a spring 127 anchored at one end to the rear wall 14 and having the opposite end connected to an intermediate portion of the lever 125. The spring 127 will move all of the nozzles 117 simultaneously into the vials v. The nozzles 117 are simultaneously moved out of the vials and the movement of the nozzles 117 into the vials by the spring 127 is controlled by a cam disk 128 secured on the drive shaft 50 to engage a roller 129 on the lever 125 adjacent to the pivotal connection with the link 126. The cam disk 128 has a high portion of greater extent than the low portion whereby the nozzles 117 are positioned out of the vials for a longer period than the period of moving the nozzles 117 into and out of the vials by the spring 127 and the roller 129 riding onto and off the low portion of the cam disk 128 to permit the intermittent rotation of the disks 109.

After the vials are germicidally cleaned by the jets of fluids injected therein by the nozzles 117, said vials are removed from the recesses 108 by a tray 130 having side walls 131 to retain the vials on the tray and said tray is supported to extend in a horizontal plane by a bracket 132 secured to the beam 18, as shown in Figures 2 and 9. The forward end of the tray extends between the disks 109 and in a plane tangential to the arc of the bottom walls of the recesses 108 and the edge of the tray at said end is beveled to engage the successive vials in the recesses 108 after leaving the last of the nozzles 117 and remove said vials from said recesses, as shown at 133 in Figure 9. The vials are moved along the tray 130 by successive vials leaving the recesses 108 and delivered by the tray to an appropriate depository or filling and sealing apparatus, not shown.

The disks 27, 55, 64, 72, 105 and 109 are of the same diameter and arranged with the same number of recesses 29, 54, 63, 71, 104 and 108, respectively.

The disks 27, 55, 64, 72, 105 and 109 are intermittently and simultaneously rotated with the disks 27, 64 and 105 being rotated in a counter-clockwise direction and the disks 55, 72 and 109 being rotated in a clockwise direction. This is accomplished by connecting the shafts 28, 56, 65, 73, 106 and 110 by meshing gears 134, 135, 136, 137, 138 and 139 fixed respectively on the end portions of said shafts extended exteriorly of the rear wall 14. The gears are enclosed by a housing 140 mounted on the exterior of said rear wall, as shown in Figures 3, 5, 8, 10, 11 and 12. The drive shaft 50 is connected to the shaft 73 to impart intermittent movement to said shaft 73 and the other shafts 28, 56, 65, 106 and 110 through the meshing gears 134, 135, 136, 137, 138 and 139. This is accomplished by a ratchet wheel 141 having one tooth for every two of the recesses 71, that is if there are thirty recesses 71, there will be fifteen teeth in the wheel 141, whereby one intermittent movement of the ratchet wheel will move the disks 27, 55, 64, 72, 105 and 109 a distance equal to the space of two recesses 29, 54, 63, 71, 104 and 108, respectively. The ratchet wheel 141 is secured on the shaft 73 and intermittently rotated by a pawl 142 pivoted on an intermediate portion of a lever 143 rotatably mounted at one end portion on the shaft 73. The opposite end portion of the lever 143 is provided with a roller 144 yieldingly urged by a spring 145 to ride on a cam disk 146. The pawl 142 is yieldingly urged by a spring 147 to engage successive teeth of the ratchet wheel. The cam disk 146 is secured on a shaft 148 rotatably mounted on the rear wall 14 and in a cross-piece 149 supported between parallelly spaced arms 150 mounted on the rear wall 14. The arms 150 are arranged with bearings 151 to support the drive shaft 50. The shaft 148 is continuously rotated by the drive shaft 50 through beveled gearing 152, Figure 2. The continuous rotation of the shaft 148 will continuously rotate the cam disk 146 and reciprocate the lever 143. The movement of the lever 143 to the right, as seen in Figure 2, will move the pawl 142 and ratchet wheel 141 one step and the movement of the lever 143 to the left will impart retrograde movement to the pawl 143 which will ride over the ratchet wheel tooth without imparting movement to the ratchet wheel. To hold the shaft 73 against movement during the retrograde movement of the pawl 142, there is provided a disk 153 having notches 154 equidistantly spaced in the peripheral portion of the disk 153 in lateral alignment with the teeth of the ratchet wheel 141. The disk 153 is secured on the shaft 73 and the notches 154 are successively positioned by the intermittent rotation of the shaft 73 to be engaged by a roller 155 carried by an intermediate portion of a lever 156 rotatably mounted at one end on the shaft 106. The roller 155 is yieldingly urged toward the periphery of the disk 153 into engagement with one of the notches 154 by a spring 157 anchored at one end to one of the arms 150 and the opposite end connected to the end of the lever 156 opposite the end rotatably mounted on the shaft 106. The roller 155 is periodically disengaged from a notch 154 to permit rotation of the shaft 73 by the pawl 142. This is accomplished by a cam disk 158 secured on the shaft 148 to engage a roller 159 on the lever 156 adjacent to the spring 157 and actuate the lever 156 to move the roller 155 out of the notch 154 against the force of the spring 157.

The drive shaft 50 is supported in adidtion to the bearings 151 by a bearing 160 on the beam 15 and a bearing 161 on a cross-piece 162 secured at the ends to the upright 17 and the rear wall 14.

The drive shaft 50 is continuously rotated by a reduction-geared motor 163 mounted on a shelf 164 supported by the table legs 12. The motor 163 is connected to the drive shaft 50 by a belt 165 enclosed by a housing 166 supported by the cross-piece 162, the table top 11 and the shelf 164, as shown in Figures 1 and 2.

The tray 130 is supported in addition to the bracket 132 from the shelf 164 by a brace 167.

Having thus described my invention, I claim:

1. Apparatus for cleaning open ended vials and inserting a plunger into one end of each cleaned vial, transporting means for moving the vials substantially horizontally in a vertically undulating path having a plurality of rises and dips, uniformly spaced means including outwardly faced openings on said transporting means for receiving the vials, a continuously rotating drive shaft, means connected with said shaft for producing intermittent movement of said transporting means a distance corresponding to the uniform spacing of the openings, gravitationally acting dispensing means arranged above said transporting means for delivering vials into said openings adjacent the beginning of said undulating path, means located below the vial delivering means, adjacent the first dip in the undulating path for cleaning the vials, means adjacent the first rise in the undulating path for supplying rinse fluid, means adjacent the second dip in the undulating path for supplying drying fluid, means adjacent the second rise in the undulating path for inserting a plunger in one end of each vial to close said one end, means at the ascending side of the third rise of the undulating path to inject a sequence of different types of fluids, including a cleaning fluid, into the end of each vial opposite the closed end, and means for receiving the vials from the transporting means as they leave the crest of the third rise in the undulating path, a plurality of cams mounted on said drive shaft for operating said vial cleaning means, said plug inserting means and said fluid injecting means during rest periods in the intermittent movement of said transporting means.

2. Apparatus according to claim 1, wherein the vial transporting means comprises a train of laterally spaced disks rotatably mounted to rotate in vertical planes with the peripheral portions of succeeding laterally spaced disks overlapping and wherein the space openings are recesses to support vials parallel to the axes of rotation of the disks and transfer the vials from laterally spaced disks to succeeding laterally spaced disks, and wherein the means for intermittently moving said vial transporting means causes step by step rotation of said disks.

3. Apparatus according to claim 2, wherein the axes of rotation of the adjacent laterally spaced disks lie in different horizontal planes.

4. Apparatus according to claim 3, wherein the means causing step by step rotation of said disks advances the disks a distance equal to two of the recesses therein.

5. Apparatus according to claim 2, wherein the means to receive the vials from the transporting means subsequent to the injection of the different types of fluids into said vials comprises a tray extending in a horizontal plane tangentially to the arc of the bottom walls of the recesses of the sixth laterally spaced disks in the train of disks.

6. Apparatus according to claim 1, wherein the means to insert a plunger into one end of each vial comprises a head slidable toward and away from one side of the plane of the undulating path, a pair of parallel spaced rods carried by the head, a pivoted lever operatively connected to the head, yieldingly urged to move the rods to insert plungers into one end of spaced vials on the transporting means and reciprocated by one of the cams on the drive shaft to move the rods from the vials, a pair of parallel spaced abutments slidable toward and away from the opposite side of the plane of the undulating path, and a pivoted lever connected to each of said abutments, yieldingly urged to engage the abutments with the opposite ends of the vials while the plungers are inserted into the first ends of said vials and reciprocated by one of the cams on the drive shaft to move the abutments from the vials.

7. Apparatus according to claim 1, wherein the means to inject in sequence different types of fluids comprises a plate slidable toward and away from one side of the plane of the undulating path, a plurality of nozzles carried by the plate in alignment wtih the vials on the transporting means, sources of supplies of said different types of fluids, a flexible hose connecting a source of supply with a nozzle, and a pivoted lever operatively connected to the plate, yieldingly urged to move the plate toward the path of travel of the vials and the nozzles into the vials and reciprocated by one of the cams on the drive shaft to move the plate and nozzles from the vials.

(References on following page)

References Cited in the file of this patent

UNITED STATES PATENTS

| | | |
|---|---|---|
| 806,846 | Routson | Dec. 12, 1905 |
| 942,074 | Jaycox | Dec. 7, 1909 |
| 1,492,924 | Knight | May 6, 1924 |
| 1,602,667 | Hansen | Oct. 12, 1926 |
| 2,359,775 | McManus et al. | Oct. 10, 1944 |
| 2,459,954 | Morgan | Jan. 24, 1949 |
| 2,549,216 | Martin | Apr. 17, 1951 |
| 2,754,534 | Varga | July 17, 1956 |

FOREIGN PATENTS

| | | |
|---|---|---|
| 391,820 | Great Britain | May 4, 1933 |
| 679,163 | Germany | July 31, 1939 |